US007038826B2

(12) United States Patent
Yasuda

(10) Patent No.: US 7,038,826 B2
(45) Date of Patent: May 2, 2006

(54) MOVABLE MICRO-BODY

(75) Inventor: Susumu Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 10/621,348

(22) Filed: Jul. 18, 2003

(65) Prior Publication Data

US 2004/0021924 A1    Feb. 5, 2004

(30) Foreign Application Priority Data

Jul. 19, 2002  (JP)  ............................. 2002-211262
Jul. 11, 2003  (JP)  ............................. 2003-195728

(51) Int. Cl.
*G02B 26/08* (2006.01)

(52) U.S. Cl. ...................... 359/224; 347/260
(58) Field of Classification Search ........ 359/198–199, 359/223, 224, 290, 291, 298; 310/309, 311, 310/272, 40 MM
See application file for complete search history.

(56) References Cited

U.S. PATENT DOCUMENTS 3,532,408 A * 10/1970 Dostal ...................... 359/199
4,317,611 A    3/1982 Petersen
6,172,797 B1 * 1/2001 Huibers ..................... 359/291

FOREIGN PATENT DOCUMENTS

JP        6-82711       3/1994

* cited by examiner

*Primary Examiner*—James Phan
(74) *Attorney, Agent, or Firm*—Fitzpatrick, Cella, Harper & Scinto

(57) ABSTRACT

A movable micro-body can reduce deflections and show a large permissible angle of twist. The movable micro-body includes a movable plate and one or two torsion bars, the movable plate being supported by a support member with interposition of at least one link member arranged in a direction intersecting the torsion bars.

11 Claims, 18 Drawing Sheets

ACCELERATION

ACCELERATION

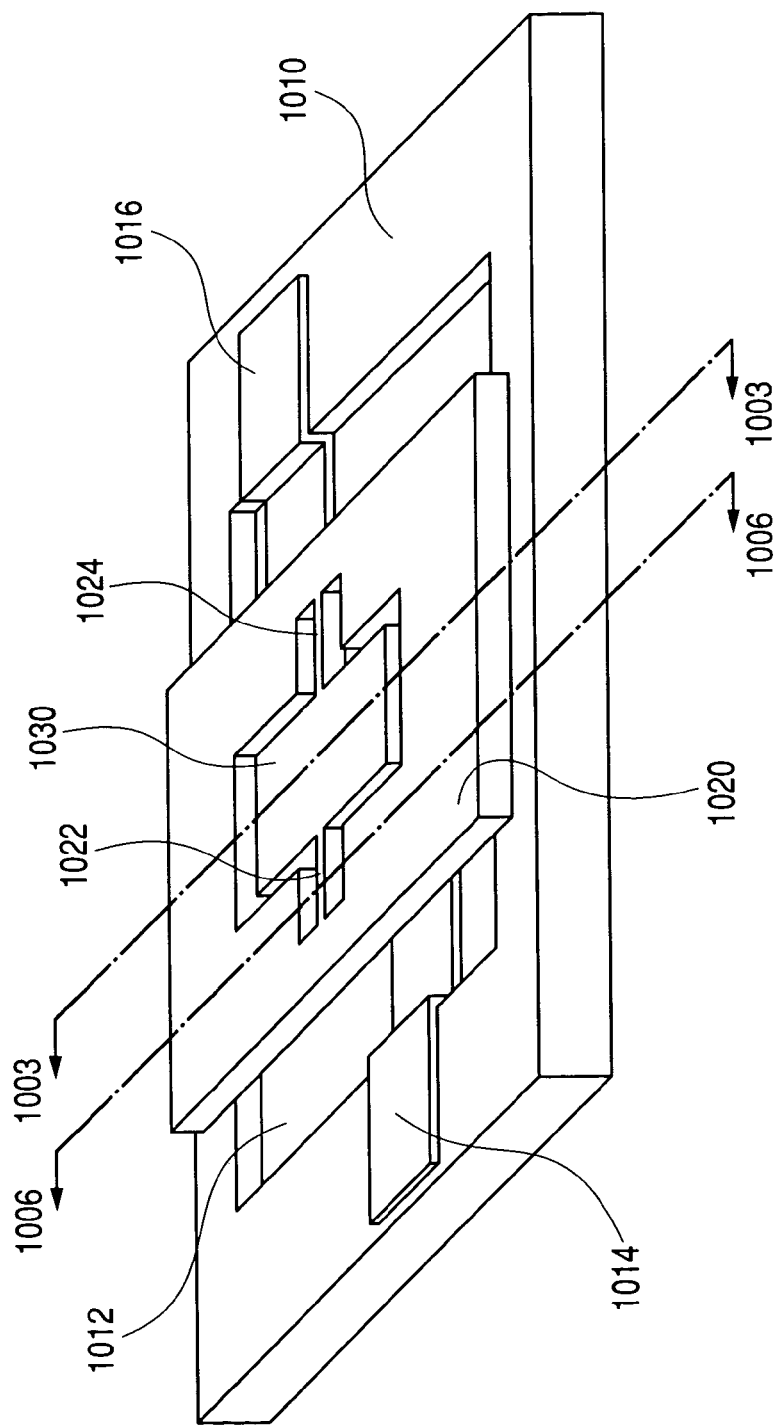

MOVABLE MICRO-BODY

BACKGROUND OF THE INVENTION

1. Field of the Invention

This invention relates to a micro-machine. More particularly, the present invention relates to a movable micro-body having a movable plate.

2. Related Background Art

It is well known that, as a result of any attempt of downsizing a machine element, the surface force comes to take a large proportion relative to the body force in the total force exerted to the element. Therefore, it is a general practice to minimize the number of sliding parts and revolving parts when designing a micro-machine.

FIG. 16 of the accompanying drawings is a schematic perspective view of an optical deflector disclosed in U.S. Pat. No. 4,317,611, and FIG. 17 is an exploded perspective view of the optical deflector of FIG. 16, illustrating the internal structure thereof. FIGS. 18 and 19 are schematic cross sectional views of the silicon thin plate 1020 taken along lines 1003 and 1006 in FIG. 16, respectively.

A recess 1012 is formed in a substrate 1010 made of an insulating material. A pair of drive electrodes 1014, 1016 and a mirror support member 1032 are arranged on the bottom of the recess 1012. The silicon thin plate 1020 is formed integrally with a pair of torsion bars 1022, 1024 and a mirror 1030. The mirror 1030 is coated on the surface thereof with a substance showing a high optical reflectivity and supported by the torsion bars 1022, 1024 so as to be able to swing freely. The silicon thin plate 1020 is disposed opposite to the drive electrodes 1014, 1016 with a predetermined gap that reliably separates it from the electrodes.

The silicon thin plate 1020 is electrically grounded. As an alternating voltage is applied to the drive electrodes 1014, 1016, electrostatic attracting force is exerted onto the mirror 1030 to make the latter swing around the longitudinal axis of the torsion bars 1022, 1024.

The inventor of the present invention looked into the bearing rigidity of the mirror 1030. The bearing rigidity involves the torsional rigidity $k_\theta$ of the torsion bars 1022, 1024 as observed around the longitudinal axis thereof and the deflection rigidities $k_x$ and $k_y$ as observed in the respective directions of x, y. The sense of torsion and the directions of x and y are shown in FIGS. 22A through 22C. The sense of torsion is indicated by means of the arrow in FIG. 22A, whereas the y and x directions are indicated respectively by means of the arrow in FIG. 22B and the arrow in FIG. 22C. The torsional rigidity refers to the torque necessary for twisting the torsion bars by a unit angle and the deflection rigidity refers to the force necessary for displacing the torsion bars in a direction perpendicular to the axis by a unit length. When the swinging body (movable body) is required to move in the swinging direction but not desired to move in the deflecting directions, it is desirable that the torsion bars show large deflection rigidities and a small torsional rigidity.

For the purpose of simplification, assume here that the cross section of the torsion bars taken along a direction perpendicular to the axis around which they are twisted shows a rectangle having long sides of a and short sides of b. The torsional rigidity $k_\theta$, the largest permissible angle of twist $\theta_{max}$ and the deflection rigidities in the x and y directions $k_x$ and $k_y$ are expressed respectively by the formulas below;

$$k_\theta = 2 \times \frac{GJ}{l} = 2 \times \beta(a/b)\frac{Gab^3}{l} \quad (1)$$

$$\theta_{max} = \frac{\alpha(a/b)l\tau_{max}}{\beta(a/b)bG} \quad (2)$$

$$k_x = 2 \times \frac{192EI_x}{l^3} = \frac{32Ea^3b}{l^3} \quad (3)$$

$$k_y = 2 \times \frac{192EI_y}{l^3} = \frac{32Eab^3}{l^3} \quad (4)$$

$$J = \beta ab^3$$

$$I_x = \frac{ab^3}{12}$$

$$I_y = \frac{a^3b}{12}$$

$$a > b$$

where

E: the transversal modulus of elasticity (Young's modulus) of the material of the torsion bars, G: the longitudinal modulus of elasticity (Young's modulus) of the material of the torsion bars, $\tau_{max}$: the strength of the material of the torsion bars, a, b: the lengths of the sides of the rectangular cross section of the torsion bars, l: the length of the torsion bars, J: the secondary polar moment at the rectangular cross section of the torsion bars, $I_x$: the secondary moment at the rectangular cross section of the torsion bars in the x direction and $I_y$: the secondary moment at the rectangular cross section of the torsion bars in the y direction.

Note that $\alpha$ and $\beta$ are coefficients as defined in Table 1 below.

TABLE 1

| a/b | 1.0 | 1.5 | 2.0 | 2.5 | 3.0 | 4.0 | 6.0 | 8.0 | 10.0 | ∞ |
|---|---|---|---|---|---|---|---|---|---|---|
| α | 0.208 | 0.231 | 0.246 | 0.258 | 0.267 | 0.282 | 0.299 | 0.309 | 0.313 | 0.333 |
| β | 0.141 | 0.196 | 0.229 | 0.249 | 0.263 | 0.281 | 0.299 | 0.309 | 0.313 | 0.333 |
| α/β | 1.48 | 1.18 | 1.07 | 1.04 | 1.02 | 1.00 | 1.00 | 1.00 | 1.00 | 1.00 |

FIG. 20 of the accompanying drawings is a schematic illustration of a drive unit for driving a scanning mirror disclosed in Japanese Patent Application Laid-Open No. 6-82711. Referring to FIG. 20, the scanning mirror 3010 comprises a mirror face section 3012 formed typically by means of evaporation of aluminum on one of the oppositely disposed principal surfaces of a flat and rectangular glass plate 3011 and a rare earth type thin film permanent magnet 3013 formed typically by sputtering SmCo (samarium cobalt) on the other principal surface of the glass plate 3011.

A pair of strip-shaped thin film torsion bars 3014 typically made of metal such as stainless steel or beryllium copper are rigidly secured to the respective middle points of the longitudinal opposite ends of the mirror face section 3012 at one of the opposite ends each thereof and to the unit main body (not shown) at the other end each. The scanning mirror 3010 is adapted to be angularly displaced to swing around the drive axis 3015 as the two torsion bars 3014 are twisted. The permanent magnet 3013 is magnetized in such a way that it shows opposite polarities at the opposite sides relative to the drive axis 3015.

Referring to FIG. 20, there is also shown a magnetism generating member 3020 formed by winding a coil 3021 around a coil frame 3022 and also around an axis that is perpendicular to the drive axis 3015 of the scanning mirror 3010 and disposed near the principal surface of the scanning mirror 3010 such that the permanent magnet 3013 is arranged with a predetermined distance separating the magnetism generating member from the principal surface.

The above arrangement is operated as the coil 3021 is electrically energized for excitation so as to generate magnetism having magnetic poles as shown in FIG. 21 from the magnetism generating member 3020. Then, attracting force and repelling force arise between the magnetic poles of the generated magnetism and those of the permanent magnet 3013 so that consequently the torsion bars 3014 of the scanning mirror 3010 are twisted. Thus, the scanning mirror 3010 can be angularly displaced around the drive axis 3015 in the sense as indicated by the arrows in FIG. 21 by a desired angle as a function of the magnetism generated from the magnetism generating member 3020.

However, the inventor of the present invention realized that the above described related art movable micro-bodies are accompanied by the following problems.

1. When the secondary polar moment J at the rectangular cross section of the torsion bars is reduced to raise the permissible angle of twist of the torsion bars of either of the above described movable micro-bodies, the deflection rigidity $k_x$ or $k_y$ of the torsion bars is also reduced to consequently make the movable micro-body liable to be affected by external vibrations.

2. When, on the other hand, the length l of the torsion bars is increased to raise the permissible angle of twist of the torsion bars, the deflection rigidity $k_x$ or $k_y$ of the torsion bars is reduced to consequently make the movable micro-body also liable to be affected by external vibrations.

SUMMARY OF THE INVENTION

In view of the above identified problems, therefore, it is an object of the present invention to provide a movable micro-body whose torsion bars can be made relatively free from deviations from the axis produced by motions other than torsions by raising the deflection rigidities of the torsion bars and whose angle of displacement can be made large by increasing the permissible angle of twist.

Normally, the permissible angle of twist is reduced as the deflection rigidities are increased. However, according to the invention, the deflection rigidities can be raised without reducing the permissible angle of twist by using link members.

Deviations from an axis that are caused by external vibrations can result in deformed images that are produced in an image forming apparatus. The present invention provides a solution to such a problem.

An object showing small deflection rigidities can easily be broken by a shock particularly when it is dropped. The present invention also provides a solution to such a problem.

According to the invention, there is provided a movable micro-body comprising:
a movable plate having a surface;
one or two torsion bars supporting the movable plate;
a support member supporting the movable plate by way of the one or two torsion bars; and
at least one link member arranged in a direction intersecting the longitudinal direction of the one or two torsion bars and adapted to substantially link the support member and the movable plate by way of a through hole region.

BRIEF DESCRIPTION OF THE DRAWINGS

FIG. 16 is a schematic perspective view of a related art optical deflector, illustrating its configuration;

DESCRIPTION OF THE PREFERRED EMBODIMENTS

Now, the present invention will be described in greater detail by referring to the accompanying drawings that conceptually illustrate a movable micro-body according to the invention. The illustrated movable micro-body according to the present invention comprises a movable plate having surfaces, torsion bars, a support member and link members for substantially linking the support member and the movable plate.

Figure 14:
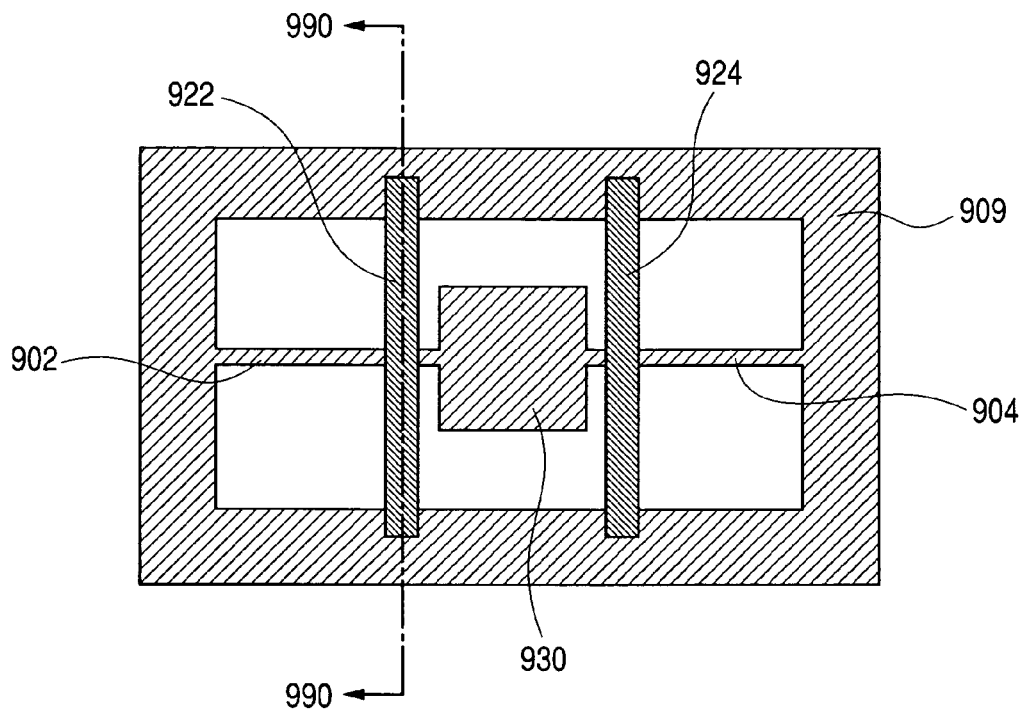
FIG. 14 is a schematic conceptual illustration of a movable micro-body according to the present invention, showing its configuration.

FIG. 14 is a schematic plan view of the movable micro-body according to the invention. Referring to FIG. 14, the movable micro-body comprises torsion bars 902, 904, an outer frame 909 that operates as support member, a pair of link members 922, 924 and a swinging member 930 that is a movable plate having surfaces. As shown in FIG. 14, the swinging member 930 has surfaces and is supported at opposite ends thereof by the respective torsion bars 902, 904 that are linearly arranged. The remote ends of the torsion bars 902, 904 are bonded to the outer frame 909 so that consequently the swinging member 930 is supported on the outer frame 909 in such a way that it can freely swing.

In the movable micro-body, the upper surfaces of the torsion bars are substantially flush with the upper surface of the swinging member. In other words, the torsion bars and the swinging member may be parts of a single plate.

A through space is formed between the outer frame 909 and the swinging member as indicated by the white area in FIG. 14. It may be referred to as a through hole region. The swinging member 930 is supported on the outer frame 909 by means of the torsion bars 902, 904 in the through hole region.

The swinging member 930, the two torsion bars 902, 904 and the outer frame 909 are formed as united together by etching a single body that is typically made of silicon single crystal.

The surface area of the swinging member 930 is very small and about several square millimeters. For example, the long sides and the short sides of the swinging member 930 are about 1.5 mm and 1.0 mm, respectively.

The link members 922, 924 are arranged on the respective torsion bars 902, 904 and extended to the outer frame 909.

Additionally, the link members 922, 924 are disposed on the opposite sides of the outer frame 909 as viewed from the torsion bars 902, 904.

In other words, the link member 922 crosses the torsion bar 902 and extends between the opposite sides of the outer frame 909 as viewed from the torsion bar 902 so as to link the torsion bar 902 and opposite sides of the outer frame 909. Similarly, the link member 924 crosses the torsion bar 904 and extends between the opposite sides of the outer frame 909 as viewed from the torsion bar 904 so as to link the torsion bar 904 and opposite sides of the outer frame 909.

The link members 922, 924 are located close to the swinging member 930 on the respective torsion bars 902, 904.

Figure 15A:
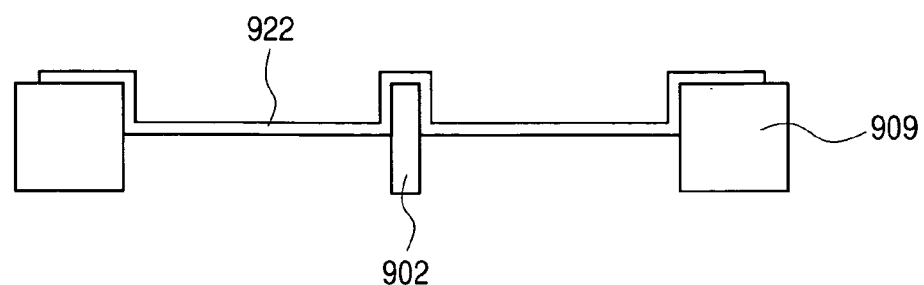
FIGS. 15A and 15B are schematic illustrations of the movable micro-body of FIG. 14, showing how its torsion bars are twisted.
Figure 15B:
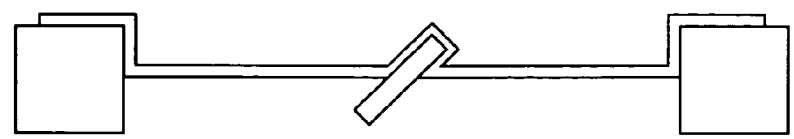
Figure 17:
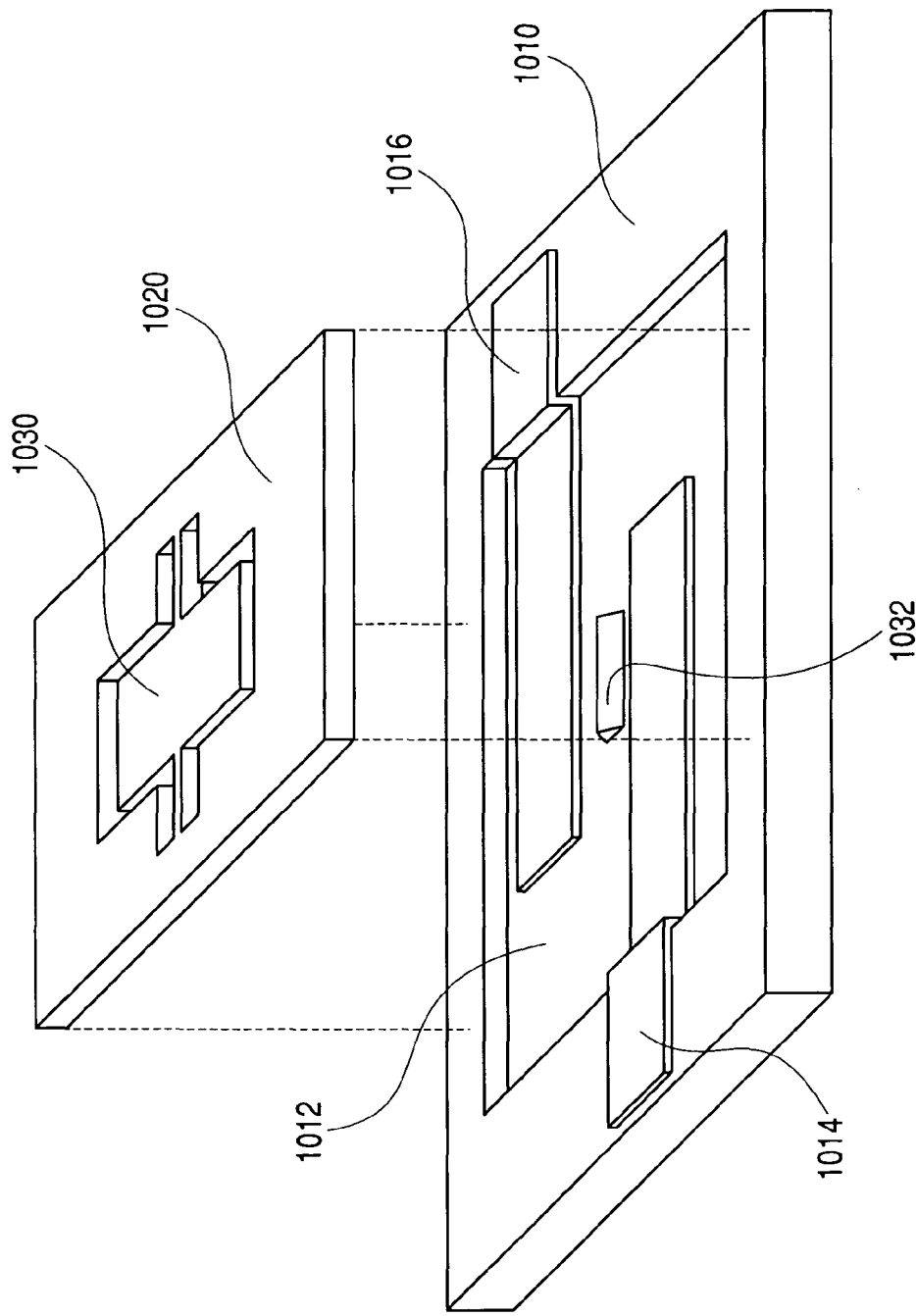
FIG. 17 is an exploded schematic perspective view of the prior art optical deflector of FIG. 16, illustrating its configuration.
Figure 18:
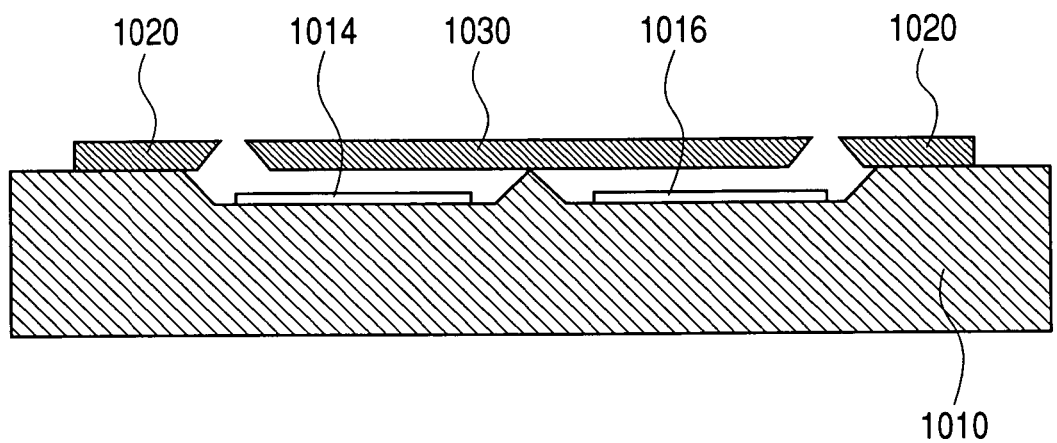
FIG. 18 is a schematic cross sectional view of the related art optical deflector of FIG. 16, illustrating its configuration.
Figure 19:
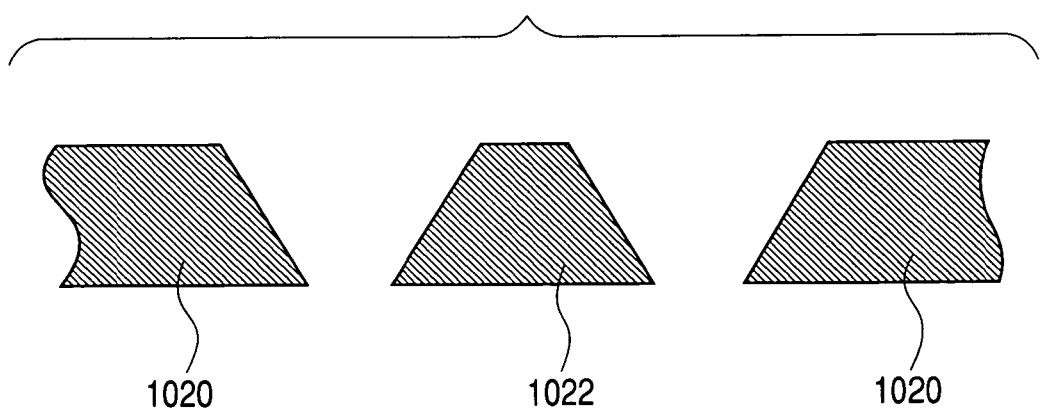
FIG. 19 is also a schematic cross sectional view of the related art optical deflector of FIG. 16, illustrating its configuration.
Figure 20:
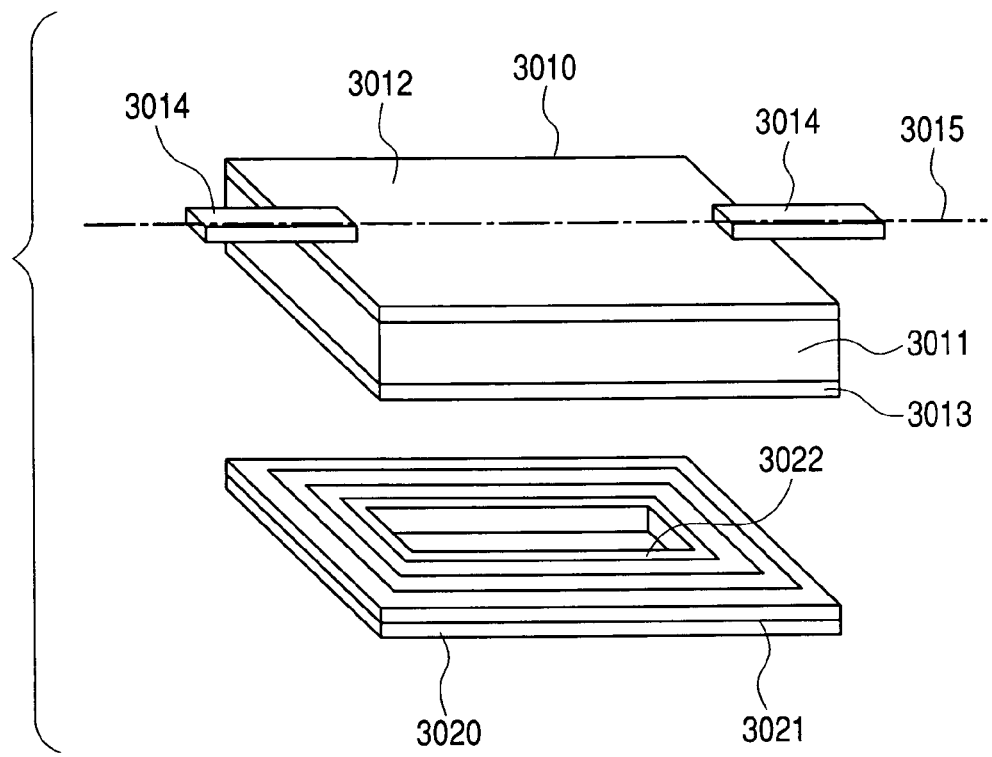
FIG. 20 is an exploded schematic perspective view of another related art optical deflector, illustrating its configuration.

In the case of this movable micro-body according to the invention, the link members 922, 924 may be made of a relatively soft and flexible material. For example, they may be made of an organic material. More specifically, they may be made of polyimide or the like. The link members 922, 924 may be formed on site so as to show an appropriate contour by way of a patterning process using the technology of photolithography and then made to show an exact final profile by removing unnecessary areas thereof. Alternatively, link members 922, 924 showing an exact final profile may be formed in advance and subsequently bonded to the respective areas of the torsion bars 902, 904 and the outer frame 909. In this movable micro-body according to the invention, the link members 922, 924 are strip-shaped. FIGS. 15A and 15B are schematic cross sectional views taken along cutting line 990 in FIG. 14. The torsion bars are in a neutral state (untwisted state) in FIG. 15A, whereas they are in a twisted state in FIG. 15B.

The link members 922, 924 of this movable micro-body according to the invention are adapted to limit the deflection of the torsion bars 902, 904 in an intra-planar direction, particularly in a direction intersecting the longitudinal direction of the torsion bars and raise the deflection rigidities of the torsion bars at and near the front ends thereof or near the swinging member 930.

Figure 21:
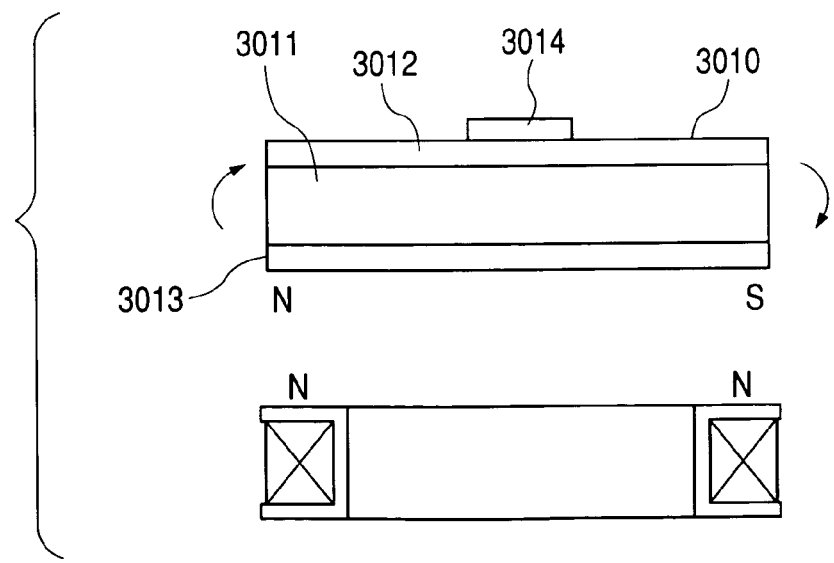
FIG. 21 is a schematic cross sectional view of the related art optical deflector of FIG. 20, illustrating its operation.
Figure 22A:
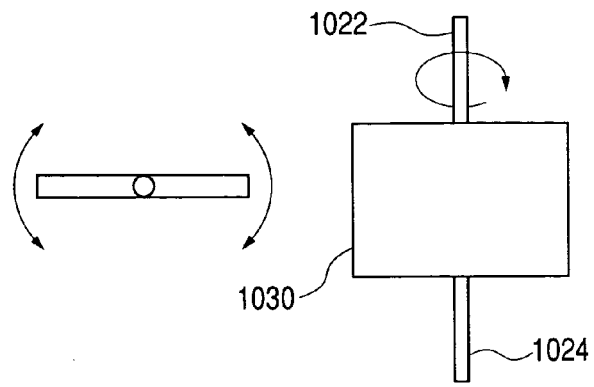
FIGS. 22A, 22B and 22C are schematic cross sectional views of the related art optical deflector of FIG. 20, illustrating its operation.
Figure 22B:
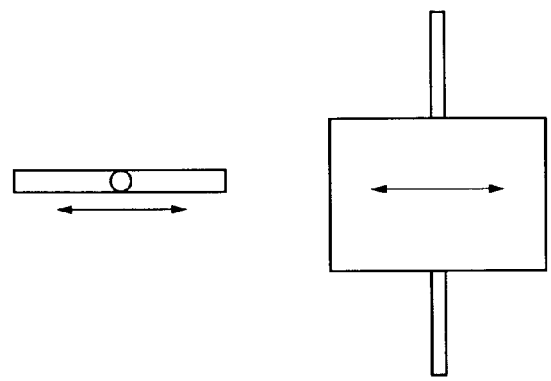
Figure 22C:
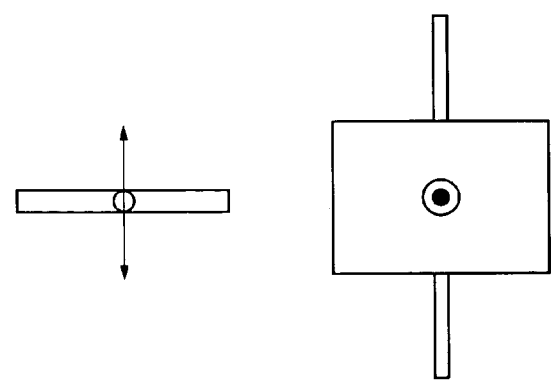

The link members are also adapted so as not to interfere with the movements of the torsion bars in the twisting direction. With this arrangement, as shown in FIG. 21B, the link members are not extended nor contracted too much if the torsion bars are twisted.

Now, the effects of the provision of the link members will be discussed below by using specific numerical values.

Assume that the cross section (taken along a direction perpendicularly intersecting the longitudinal direction of the torsion bars) of the torsion bars is a square whose sides have a length of 100 μm (a) and the torsion bars are 1,000 μm ($l_1$) long. Then, if link members are not provided, torsional rigidity $k_{\theta 1}$, largest permissible angle of twist $\theta_{max1}$, and deflection rigidities $k_{x1}$ and $k_{y1}$ are expressed respectively by the equations below:

$$k_{\theta 1} = 2 \times 0.141 G \frac{a^4}{l_1}$$

$$= 2 \times 0.141 \times 80 \times 10^9 \times \frac{(100 \times 10^{-6})^4}{1000 \times 10^{-6}}$$

$$= 2.26 \times 10^{-3} \text{ [Nm/rad]}$$

$$\theta_{max1} = 1.475 \frac{\tau_{max}}{G} \frac{l_1}{a}$$

$$= 1.475 \times \frac{1000 \times 10^{-6} \times 1000 \times 10^{-6}}{80 \times 10^9 \times 100 \times 10^{-6}}$$

$$= 0.184 \text{ [red]} = 10.6 \text{ [deg]}$$

$$k_{x1} = k_{y1}$$

$$= 2 \times \frac{E a^4}{4 l_1^3}$$

$$= 2 \times \frac{170 \times 10^9 \times (100 \times 10^{-6})^4}{4(1000 \times 10^{-6})^3}$$

$$= 8.50 \times 10^3 \text{ [N/m]}$$

where $\tau_{max}$=1,000 MPa, E=170 GPa and G=80 Gpa.

On the other hand, when link members are provided according to the invention as in the case of this movable micro-body, firstly the deflection in the Y direction (an intra-planar direction relative to the movable plate perpendicularly intersecting the longitudinal direction of the torsion bars) of the torsion bars having a square cross section is reduced due to the provision of link members.

Additionally, the displacement of the movable plate can be increased when the torsion bars are made to show a rectangular cross section. Assume that the torsion bars have a rectangular cross section whose long sides and short sides are 120 μm and 12 μm respectively and link members are provided similarly.

The length l2 of the torsion bars that can realize the same $k_\theta$ as above is expressed by the formula below.

$$l_2 = 2 \times 0.313 \times 80 \times 10^9 \times \frac{12 \times 10^{-6} \times (120 \times 10^{-6})^3}{2.26 \times 10^{-3}}$$
$$= 4.59 \times 10^{-4} \ [m]$$

Then, $$\theta_{max2} = \frac{\tau_{max}}{G} \frac{l_2}{a_2}$$
$$= \frac{1000 \times 10^6}{80 \times 10^9} \times \frac{459 \times 10^{-6}}{12 \times 10^{-6}}$$
$$= 0.478 \ [rad]$$
$$= 27.4 \ [deg]$$

$$k_{x2} = 2 \times \frac{E a_2 b_2^3}{4 l_2^3}$$
$$= 2 \times \frac{170 \times 10^9 \times (120 \times 10^{-6}) \times (12 \times 10^{-6})^3}{4 \times (459 \times 10^{-6})^3}$$
$$= 182 \ [N/m]$$

$$k_{y2} = 2 \times \frac{E a_2^3 b_2}{4 l_2^3}$$
$$= 2 \times \frac{170 \times 10^9 \times (120 \times 10^{-6})^3 \times (12 \times 10^{-6})}{4 \times (459 \times 10^{-6})^3}$$
$$= 1.82 \times 10^4 \ [N/m]$$

The rigidity $k_s$ attributable to the link member is expressed by the equation below:

$$k_s = 4 \times \frac{E_s A_s}{l_s} = 4 \times \frac{3.5 \times 10^9 \times 200 \times 10^{-12}}{200 \times 10^{-6}} = 1.40 \times 10^4 \ [N/m]$$

where $E_s$=3.5 GPa, $A_s$=2×10$^{-6}$[m]×100×10$^{-6}$ [m] and $l_s$= 200×10$^{-6}$ [m].

Thus, when the torsion bars have a rectangular cross section and link members are provided, the total rigidity $k_x'$ in the x direction of the torsion bars is expressed by the formula below.

$$k_x' = 182 + 1.40 \times 10^4 = 1.42 \times 10^4 \ [N/m]$$

Table 2 below summarily shows the above values.

TABLE 2

| | $k_\theta$ | l [m] | $\theta_{max}$[deg] | $k_x$ [N/m] | $k_y$ [N/m] |
|---|---|---|---|---|---|
| square cross section | 2.26E−3 | 1000 | 10.6 | 8.5E3 | 8.5E3 |
| this invention | 2.26E−3 | 459 | 27.4 | 1.42E4 | 1.82E4 |

As discussed above, the rigidity of the torsion bars can be raised at the front ends thereof and the permissible angle of twist of the torsion bars can be increased when the movable micro-body is provided with link members. Additionally, the total length (in the longitudinal direction) of the torsion bars can be reduced.

Thus, the link members support the swinging member so that the latter can be displaced to a large extent.

This movable micro-body according to the present invention can be used as micro-actuator in which the swinging member is displaced relative to the support member.

Therefore, when the top surface of the swinging member is realized as a mirror or a mirror is arranged on the top surface of the swinging member, the movable micro-body can be used as an optical deflector adapted to reflect light in a predetermined direction.

Then, it is possible to provide a projection type display comprising such an optical deflector that is adapted to scan a reflected beam of light. It is also possible to provide an electrophotography type image forming apparatus in which an electrostatic latent image is formed on a photosensitive body so as to form a visible image.

It is also possible to provide a dynamic sensor, an acceleration sensor to be more accurate, by utilizing the phenomenon that the swinging member is displaced relative to the support member.

Meanwhile, it is possible to provide the torsion bars of this movable micro-body with sufficient deflection rigidities while reducing the torsional rigidity and increasing the permissible angle of twist of the torsion bars by reducing the width of the torsion bars as observed in the longitudinal direction of the link members. This is because the link members boost the deflection rigidity of the torsion bars in the longitudinal direction of the link members.

While the torsion bars of this movable micro-body shows a rectangular cross section whose long sides are ten times as long as their short sides (long sides=120 μm and short sides=12 μm as described above), the long sides may preferably show some other value that is not smaller than five times of the short sides.

The swinging member of this movable micro-body can be driven to resonate. The resonance frequency band that can be used for the movable micro-body is between 14 KHz and 25 KHz.

Since a sufficient deflection rigidity can be secured by using only a single torsion bar, one of the pair of torsion bars can be omitted for the purpose of the invention to downsize the micro-body. This will be discussed below specifically by referring to Embodiment 2.

Embodiment 1

This embodiment of a movable micro-body is an electromagnetic type optical micro-deflector.

Figure 1:
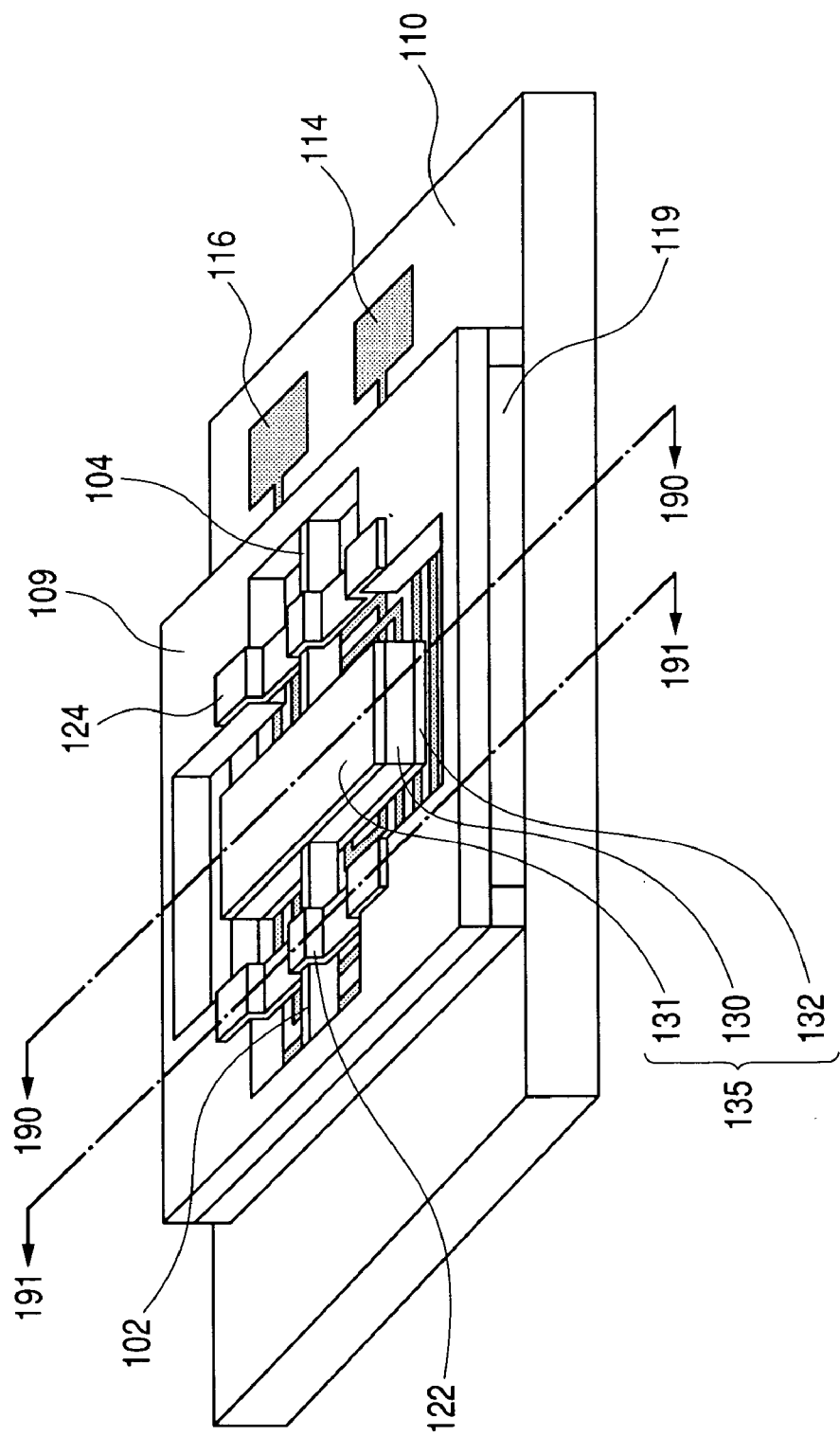
FIG. 1 is a schematic perspective view of the first embodiment of a movable micro-body according to the invention, which is an optical deflector, illustrating its configuration.

FIG. 1 is a schematic perspective view of the first embodiment of a movable micro-body according to the invention, which is an optical deflector, illustrating its configuration.

Figure 2:
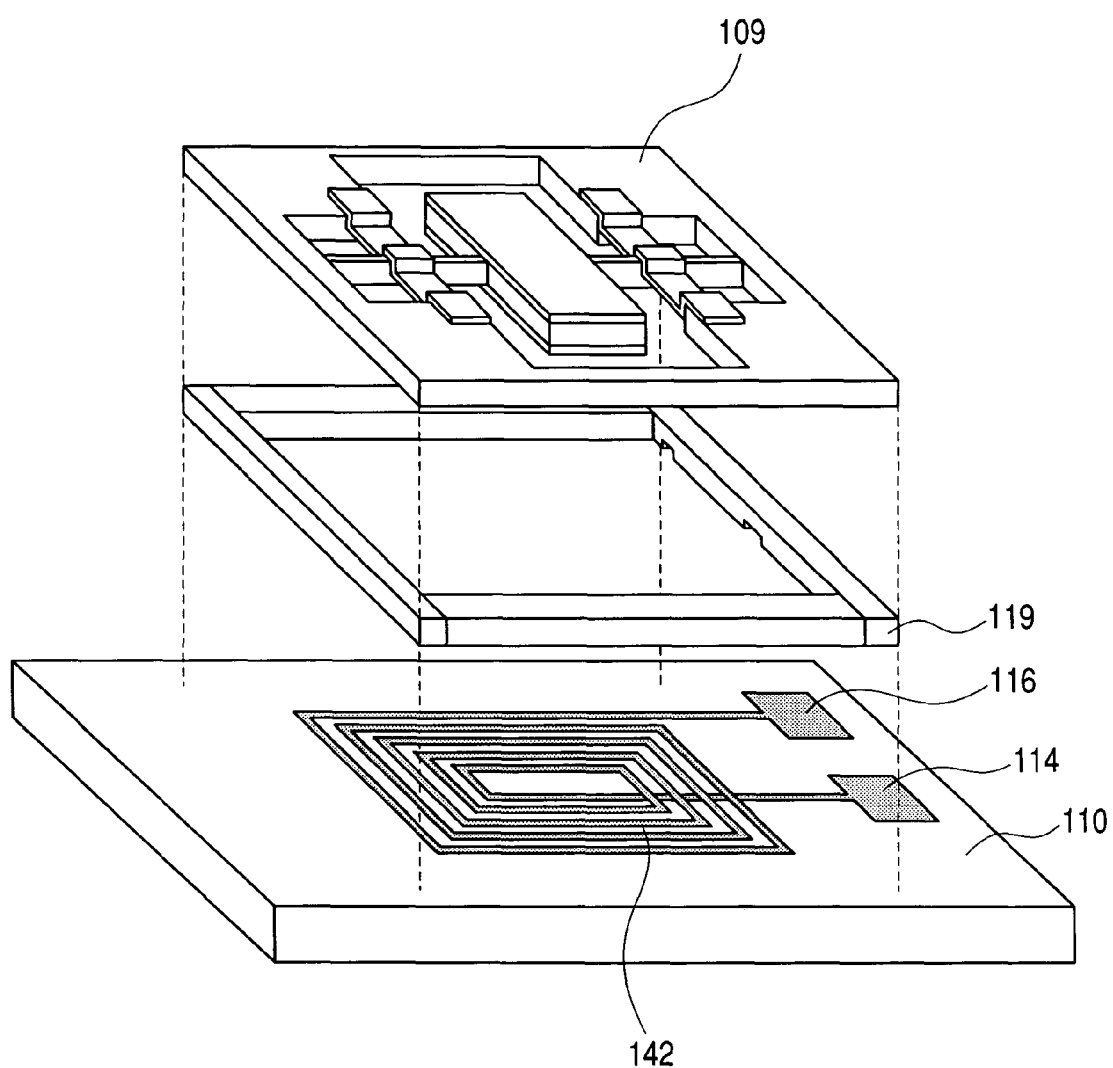
FIG. 2 is an exploded schematic perspective view of the optical deflector of FIG. 1, illustrating its configuration.
Figure 3A:
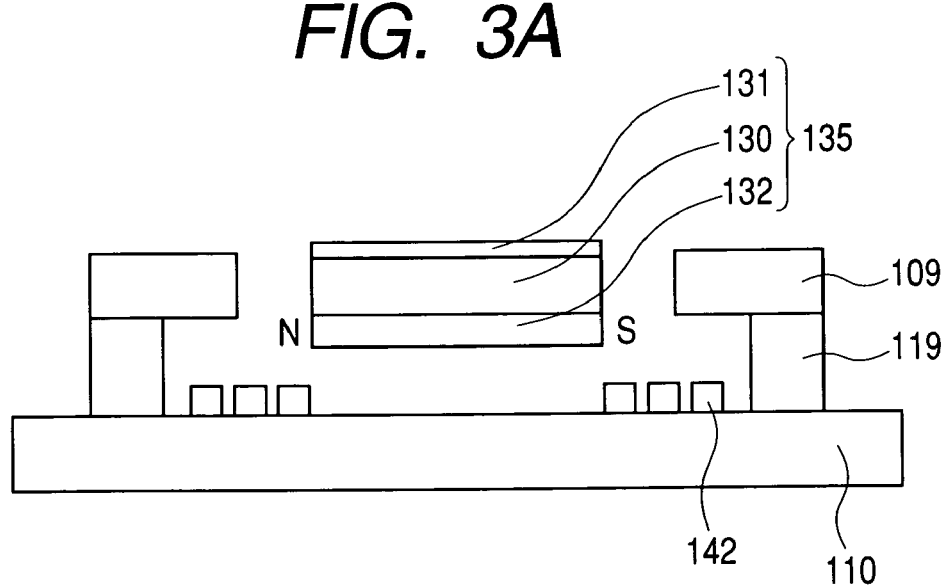
FIGS. 3A, 3B and 3C are schematic cross sectional views of the optical deflector of FIG. 1, illustrating its operation.
Figure 3B:
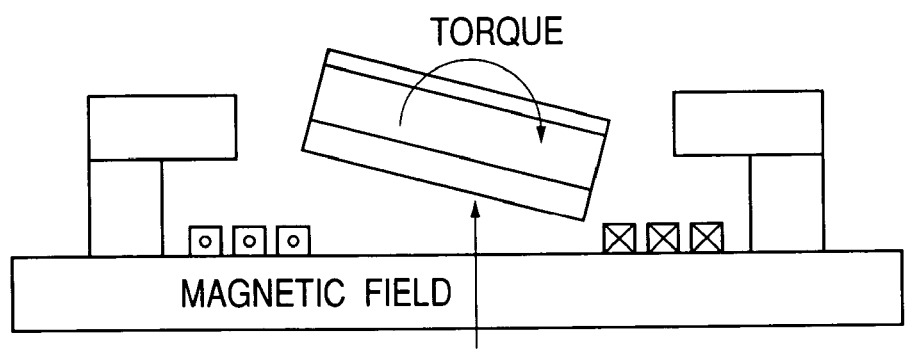
Figure 3C:
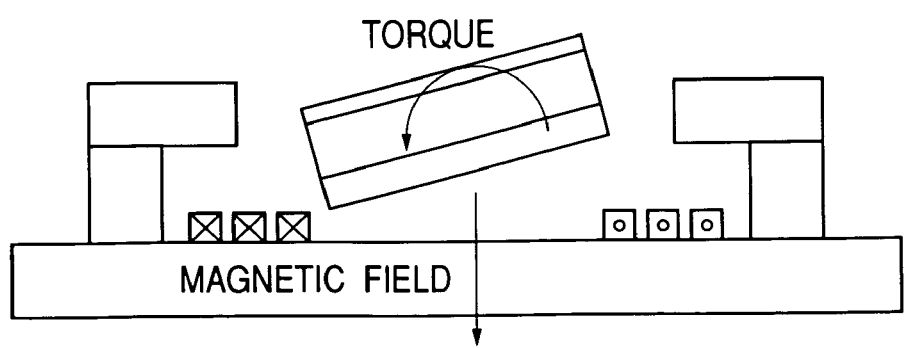

FIG. 2 is an exploded schematic perspective view of the optical micro-deflector of FIG. 1, illustrating its configuration. FIGS. 3A through 3C are schematic cross sectional views of the optical micro-deflector taken along cutting line 190 in FIG. 1.

A lower substrate 110 is provided with a plane coil 142 and fetch electrodes 114, 116. They may be formed by means of the photolithography technology.

The outer frame 109, the torsion bars 102, 104 and the swinging member 130 are integrally formed from a silicon single crystal substrate. A reflecting film 131 made of a substance showing a high optical reflectivity and a permanent magnet 132 are bonded respectively to the upper surface and the lower surface of the swinging member 130 to form a mirror section 135. The mirror section 135 is supported by the torsion bars 102, 104 in such a way that it can freely swing. The link members 122, 124 respectively link the corresponding torsion bars 102, 104 and the outer frame 109. The link members 122, 124 operate to confine the deflection of the respective torsion bars 102, 104.

The outer frame 109 and the lower substrate 110 are put together with a spacer 119 interposed between them. The angle of displacement (the inclination due to a swinging motion) of the swinging member 130 is raised when the spacer 119 is provided.

Now, the operation of this embodiment, which is an electromagnetic type optical micro-deflector, will be described by referring to FIGS. 3A through 3C, which are cross sectional views of the embodiment taken along cutting line 190 in FIG. 1.

The permanent magnet 132 is magnetized in advance to show polarities as illustrated in FIG. 3A. When an electric current is made to flow through the thin film coil 142 in a manner as shown in FIG. 3B, a magnetic field is generated and directed upward in FIG. 3B. Then, the permanent magnet 132 is subjected to a torque as indicated by a curved arrow in FIG. 3B to turn the mirror section 135 clockwise. When, on the other hand, an electric current is made to flow through the thin film coil 142 in a manner as shown in FIG. 3C, a magnetic field is generated and directed downward in FIG. 3C. Then, the permanent magnet 132 is subjected to a torque as indicated by a curved arrow in FIG. 3C to turn the mirror section 135 counterclockwise. In this way, the mirror section 135 can be made to swing by controlling the direction of the electric current flowing through the thin film coil 142. Additionally, the angle of twist of the mirror section 135 can be controlled within an angular range, which is found below the permissible largest angle of twist, by controlling the intensity of the electric current.

Figure 4A:
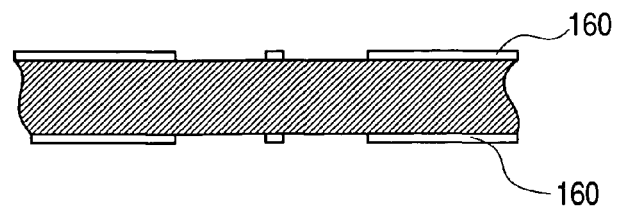
FIGS. 4A, 4B, 4C, 4D, 4E, 4F and 4G are schematic cross sectional views of the optical deflector of FIG. 1, illustrating manufacturing steps thereof.
Figure 4B:
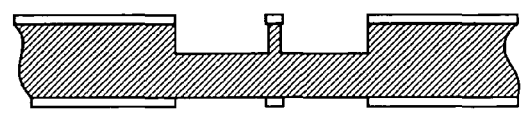
Figure 4C:
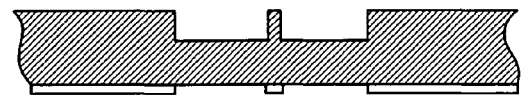
Figure 4D:
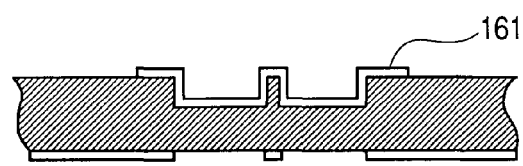
Figure 4E:
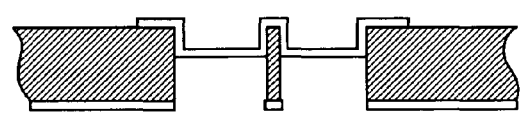
Figure 4F:
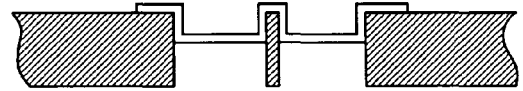
Figure 4G:
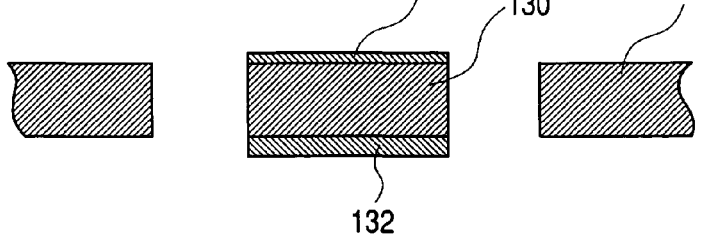

The process of preparing an electromagnetic type optical micro-deflector having the above described configuration will be described below by referring to FIGS. 4A through 4G. Note that FIGS. 4A through 4F are schematic cross sectional views taken along cutting line 191 in FIG. 1 and FIG. 4G is a schematic cross sectional view taken along cutting line 190 in FIG. 1.

1. Resist layers 160 are formed on the upper and lower surfaces of a silicon single crystal thin plate by means of a patterning operation (FIG. 4A).
2. A vertical etching operation is conducted from the upper (front) surface, using a deep etching technique such as ICP-RIE (inductively coupled plasma-reactive ion etching). The substrate is etched to about a half of its height (FIG. 4B).
3. The resist layer 160 on the upper surface is removed (FIG. 4C).
4. A polyimide layer 161 is formed and subjected to a patterning operation to produce a predetermined pattern (of strips to be more specific) (FIG. 4D).
5. A vertical etching operation is conducted from the lower (rear) surface, using a deep etching technique such as ICP-RIE (inductively coupled plasma-reactive ion etching). The substrate is etched through. As a result, no silicon single crystal is found under the polyimide layer 161 (FIG. 4E).
6. The resist layer 160 on the lower surface is removed (FIG. 4F).
7. The mirror body (swinging member) 130 is washed and cleaned and a light reflecting film 131 is formed on the upper surface while a permanent magnet 132 is bonded to the lower surface (FIG. 4G).

With this embodiment, since the deflection rigidities of the torsion bars can be raised if the permissible largest angle of twist is increased and/or the torsional rigidity is reduced so that it is possible to provide an electromagnetic type optical micro-deflector that is not liable to be affected by external vibrations and operates highly accurately. Additionally, since the torsion bars can be made short, the entire device can be downsized.

Embodiment 2

This embodiment of a movable micro-body is an electrostatic type optical micro-deflector.

Figure 5:
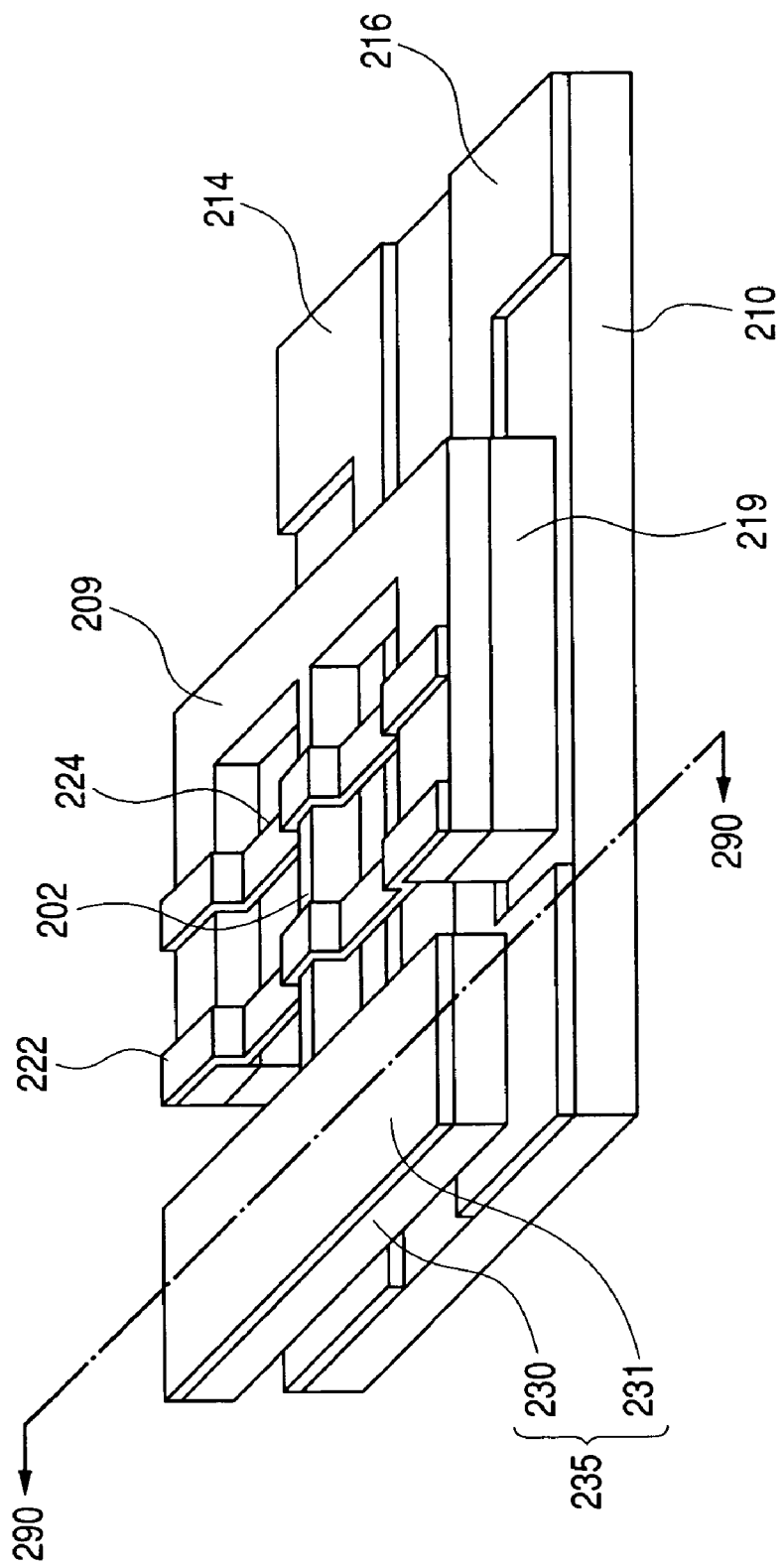
FIG. 5 is a schematic perspective view of the second embodiment of a movable micro-body according to the invention, which is an optical deflector, illustrating its configuration.
Figure 6:
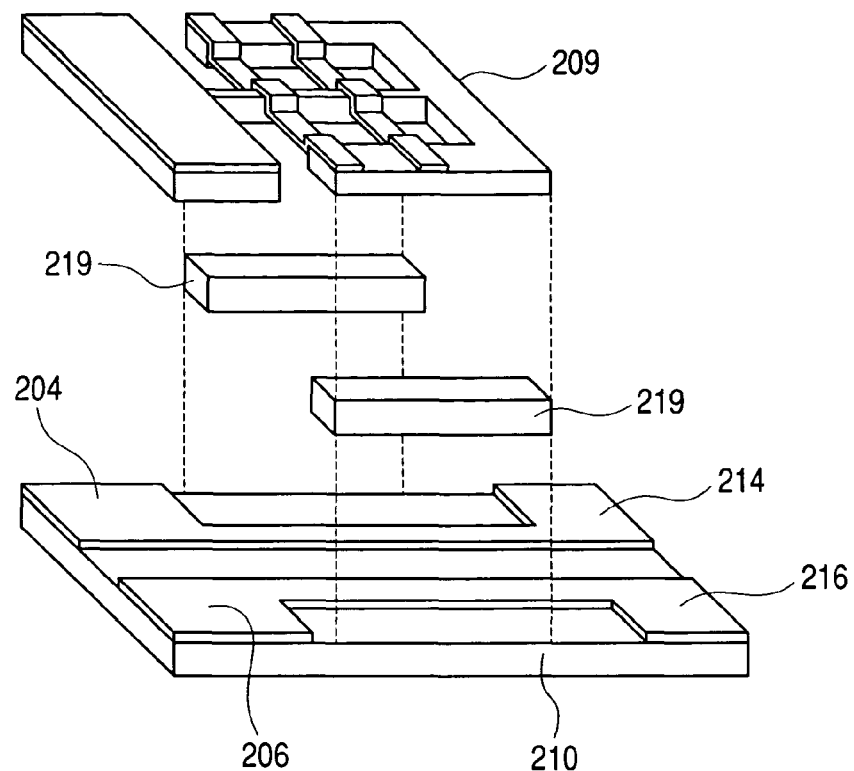
FIG. 6 is an exploded schematic perspective view of the optical deflector of FIG. 5, illustrating its configuration.
Figure 7:
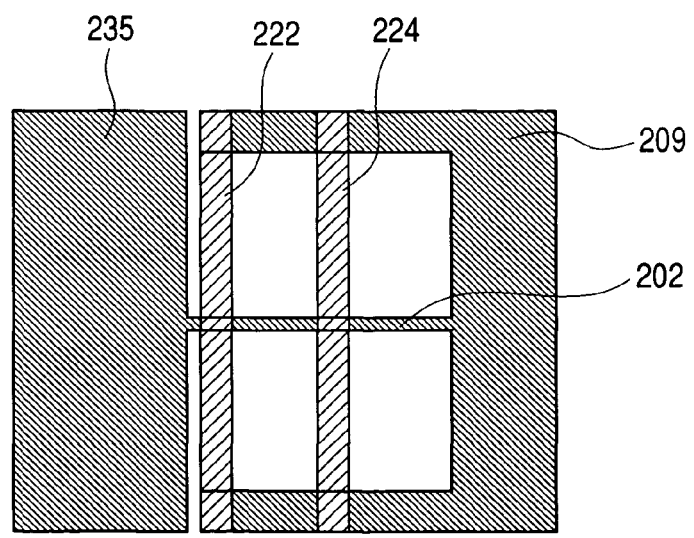
FIG. 7 is a schematic plan view of the optical deflector of FIG. 5, illustrating its configuration.

FIG. 5 is a schematic perspective view of the second embodiment of a movable micro-body according to the invention, which is an electrostatic type optical deflector, illustrating its configuration. FIG. 6 is an exploded schematic perspective view of the optical micro-deflector of FIG. 5, illustrating its configuration. FIG. 7 is a schematic plan view of the upper substrate of the optical micro-deflector.

Referring to FIG. 5 through 7, the lower substrate 210 is made of glass and drive electrodes 204, 206 and fetch electrodes 214, 216 are formed on the upper surface of the lower substrate 210 by means of the photolithography technology. The drive electrode 204 and the fetch electrode 214 are electrically coupled while the drive electrode 206 and the fetch electrode 216 are electrically coupled.

The outer frame 209, the torsion bar 202 and the swinging member 230 are integrally formed from a silicon single crystal substrate. A reflecting film 231 made of a substance showing a high optical reflectivity is formed on the upper surface of the swinging member 230 by evaporation to form a mirror section 235. The mirror section 235 is supported by the torsion bar 202 in such a way that it can freely swing. The link members 222, 224 link the torsion bar 202 and the outer frame 209. The link members 222, 224 operate to confine the deflection of the respective torsion bar 202.

The outer frame 209 and the lower substrate 210 are put together with a pair of spacers 219 interposed between them.

Figure 8A:
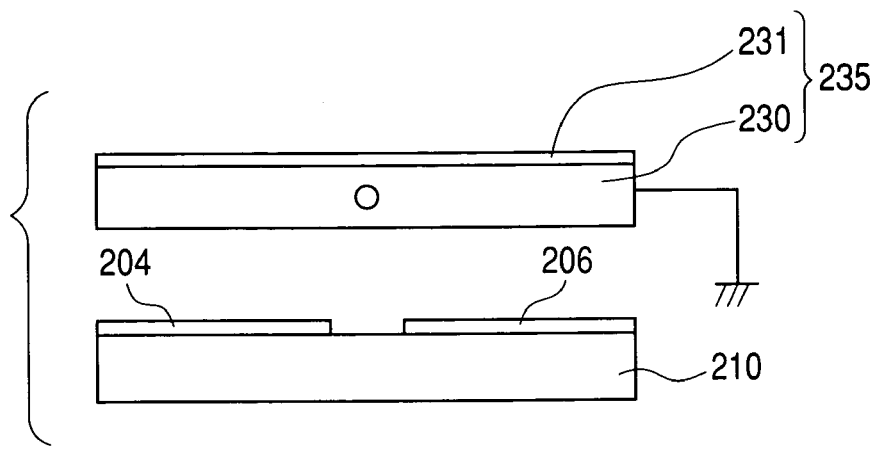
FIGS. 8A, 8B and 8C are schematic cross sectional views of the optical deflector of FIG. 5, illustrating its operation.
Figure 8B:
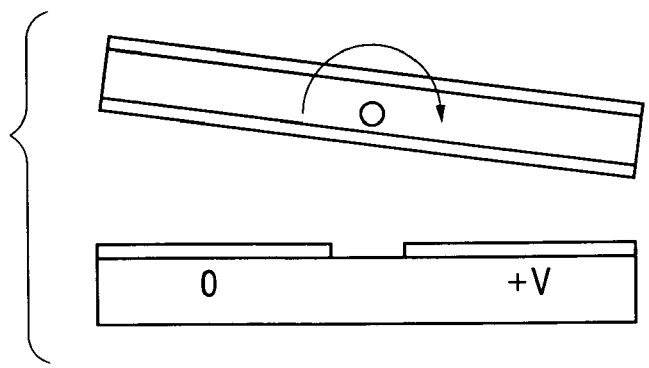
Figure 8C:
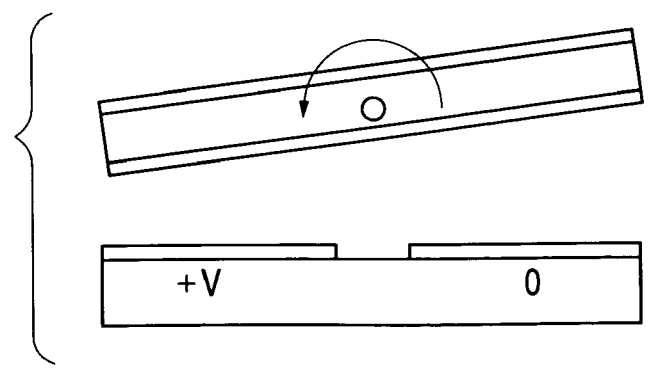

Now, the operation of this embodiment, which is an electrostatic type optical micro-deflector, will be described by referring to FIGS. 8A through 8C, which are cross sectional views of the embodiment taken along cutting line 290 in FIG. 5.

The swinging member 230 is grounded to show an electric potential of 0V. As shown in FIG. 8A, no force is applied to the swinging member 230 to make it swing when the drive electrodes 204, 206 are held to the same electric potential level (e.g., 0V). When, however, the drive electrodes 204, 206 are made to respectively show electric potentials of 0 and V as shown in FIG. 8B, an electrostatic attractive force is generated between the swinging member 230 and the drive electrode 206 to make the mirror section 235 to turn clockwise. When, on the other hand, the drive electrodes 204, 206 are made to show respective electric potentials of V and 0 as shown in FIG. 8C, an electrostatic attractive force is generated between the swinging member 230 and the drive electrode 204 to make the mirror section 235 to turn counterclockwise. In this way, the mirror section 235 can be made to swing by controlling the voltage applied to the drive electrodes 204, 206. The polarities of the applied voltage do not matter so long as a voltage difference is substantially produced between the drive electrodes 204 and 206. Then, the swinging member 230 can be driven to swing.

With this embodiment, since the deflection rigidities of the torsion bar can be raised if the permissible largest angle of twist is increased and/or the torsional rigidity is reduced so that it is possible to provide an electrostatic type optical micro-deflector that is not liable to be affected by external vibrations and operates highly accurately. Additionally, since a single torsion bar can provide deflection rigidities to a sufficient extent, the entire device can be downsized.

Embodiment 3

This embodiment of a movable micro-body is a dynamic quantity sensor.

Figure 9:
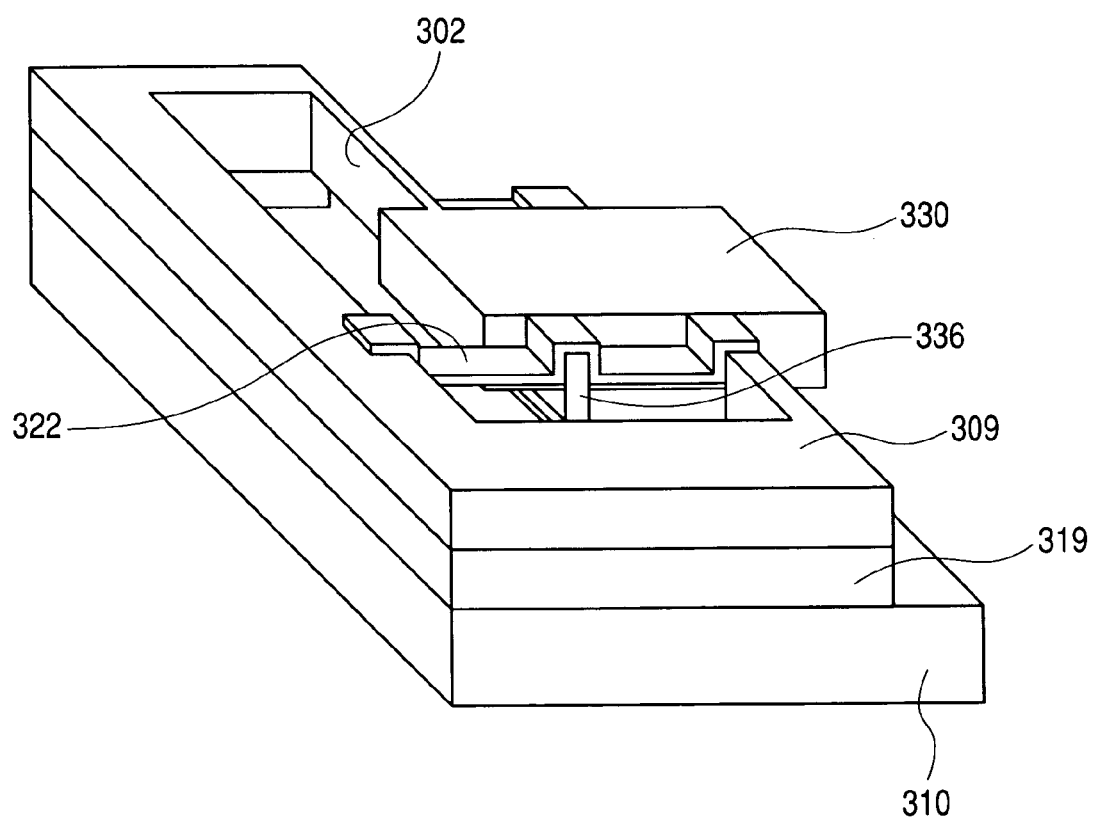
FIG. 9 is a schematic perspective view of the third embodiment of a movable micro-body according to the invention, which is an acceleration sensor, illustrating its configuration.
Figure 10:
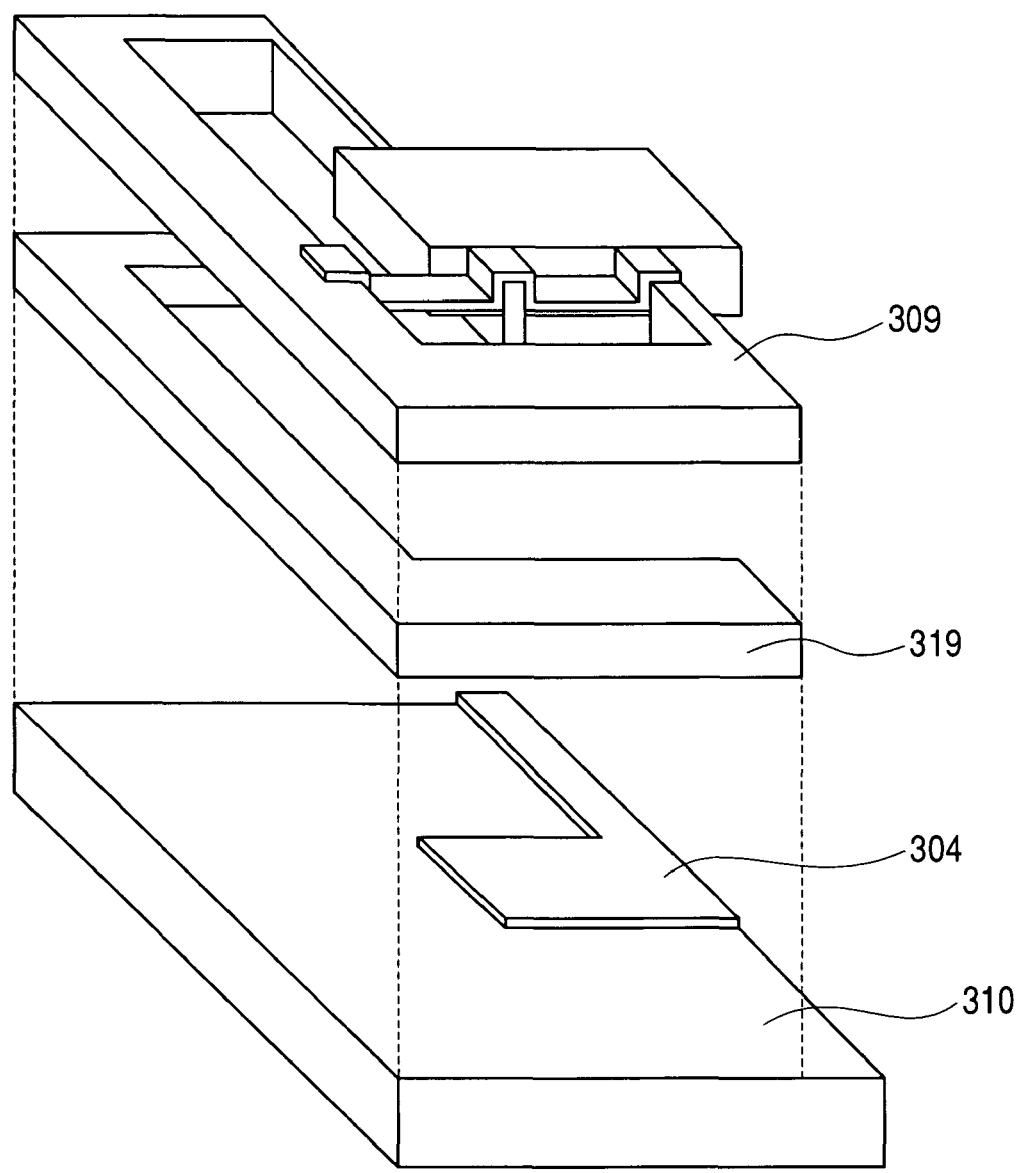
FIG. 10 is an exploded schematic perspective view of the acceleration sensor of FIG. 9, illustrating its configuration.
Figure 11:
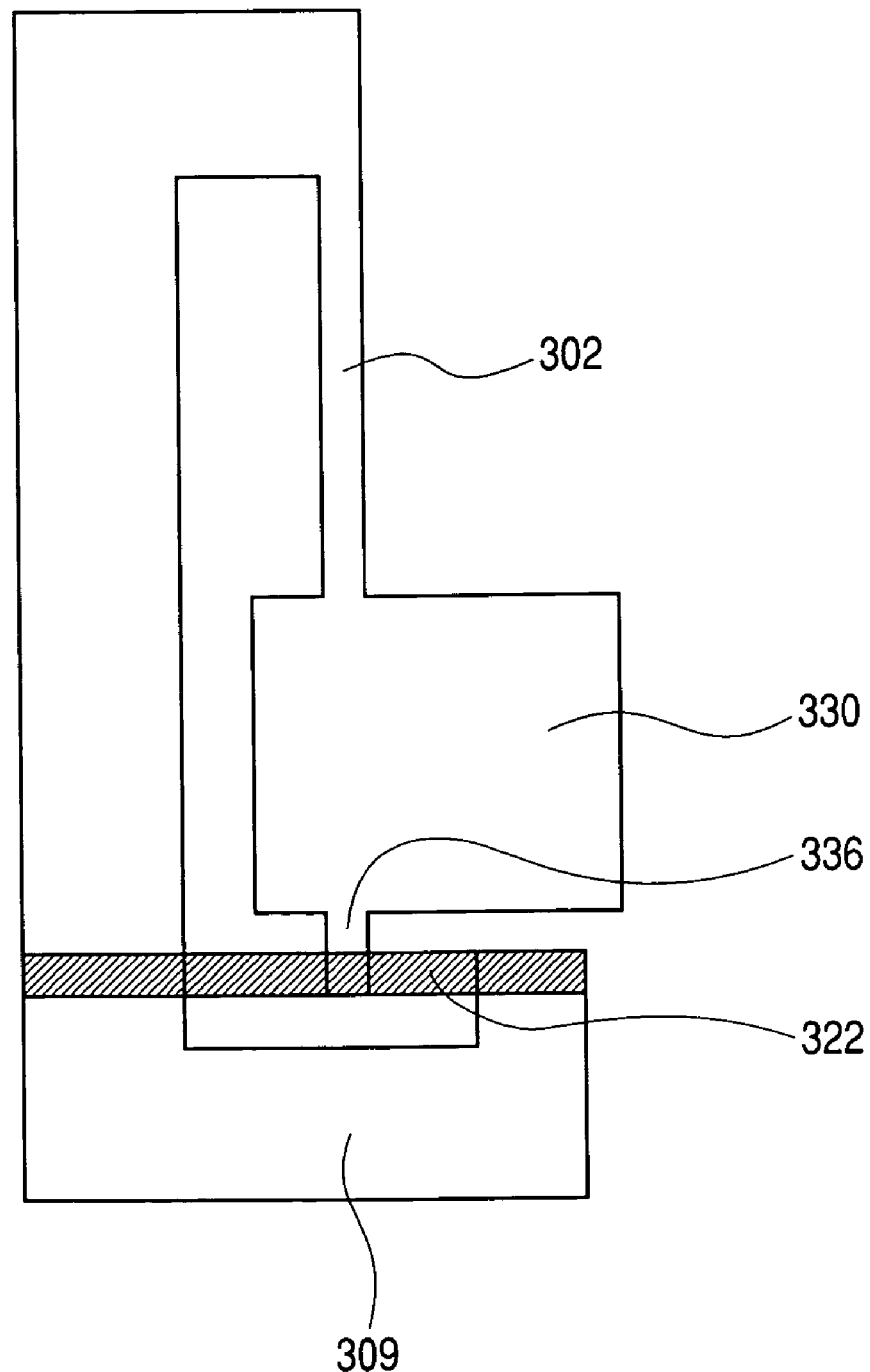
FIG. 11 is a schematic plan view of the acceleration sensor of FIG. 9, illustrating its configuration.

FIG. 9 is a schematic perspective view of the third embodiment of a movable micro-body according to the invention, which is a dynamic quantity sensor, or an acceleration sensor to be more specific, illustrating its configuration. FIG. 10 is an exploded schematic perspective view of the acceleration sensor of FIG. 9, illustrating its internal structure. FIG. 11 is a schematic plan view of the acceleration sensor of FIG. 9, illustrating its upper substrate.

The lower substrate 310 is made of glass and a detection electrode 304 is formed on the upper surface thereof by means of the photolithography technology.

The outer frame 309, the torsion bar 302, the swinging member 330 and the projecting section 336 are integrally formed from a silicon single crystal substrate. The swinging member 330 is supported by the single torsion bar 302 in such a way that it can freely swing. In the sensor of this embodiment, the torsion bar is not arranged at the center of the swinging member in order to enhance the sensitivity of the sensor. The projecting section 336 is not connected to the outer frame 309. The link member 322 links the projecting section 336 and the outer frame 309. The link member 322 operates to confine the displacement of the projecting section 336.

The link member 322 is not located on the torsion bar 302.

The outer frame 309 and the lower substrate 310 are put together with a spacer 319 interposed between them. The swinging member 330 is disposed opposite to the detection electrode 304 with a predetermined gap between them and electrically grounded.

Figure 12A:
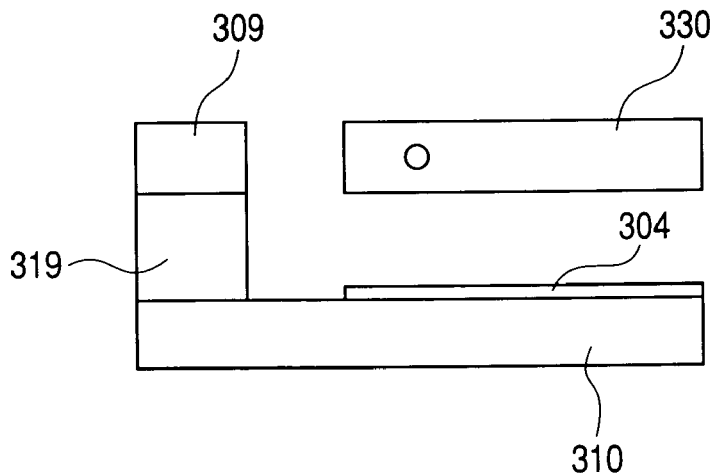
FIGS. 12A, 12B and 12C are schematic cross sectional views of the acceleration sensor of FIG. 9, illustrating its operation.

Now, the operation of the acceleration sensor will be described by referring to FIGS. 12A through 12C. FIG. 12A illustrates a neutral state where no acceleration is detected by the sensor.

Figure 12B:
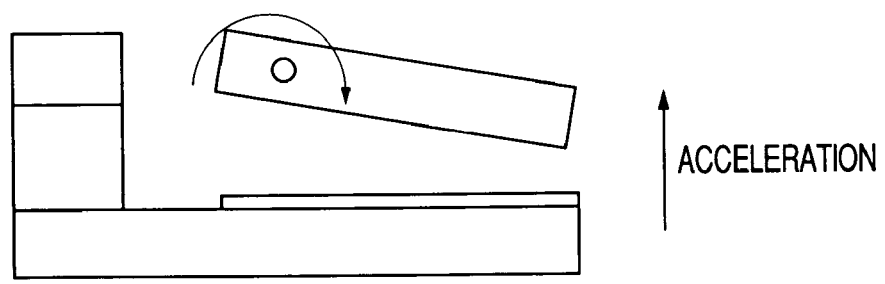
Figure 12C:
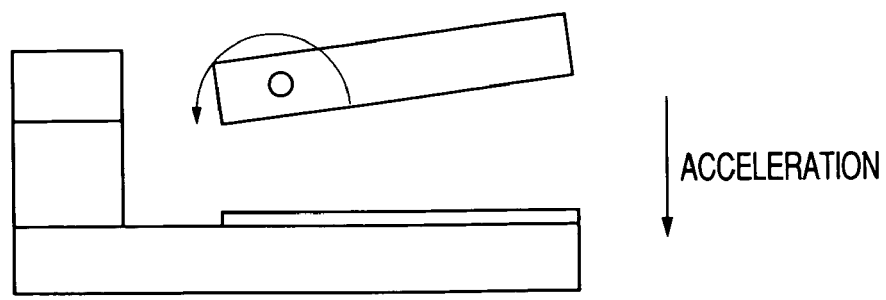

As the acceleration sensor is subjected to an upwardly directed acceleration as shown in FIG. 12B, inertial force acts on the swinging member 330 to turn the latter clockwise in FIG. 12B. To the contrary, as the acceleration sensor is subjected to a downwardly directed acceleration as shown in FIG. 12C, inertial force acts on the swinging member 330 to turn the latter counterclockwise in FIG. 12C. As the swinging member 330 is angularly displaced, the distance between the swinging member 330 and the detection electrode 304 changes to change the electrostatic capacity between the swinging member 330 and the detection electrode 304. Therefore, the acceleration can be detected by detecting the electrostatic capacity between the detection electrode 304 and the swinging member 330.

Conversely, as a voltage is applied between the detection electrode 304 and the swinging member 330, force acts between the detection electrode 304 and the swinging member 330 to turn the latter clockwise as shown in FIG. 12B. In other words, the acceleration sensor of this embodiment can be used as electrostatic actuator.

Thus, with this embodiment of the invention, it is possible to provide a dynamic quantity sensor that involves only little noise because the movable section of the sensor can hardly turn in a direction perpendicular to the torsional axis in a swinging motion. Additionally, since the deflection rigidities can be increased if the torsional rigidity is reduced, it is possible to provide a highly sensitive acceleration sensor that involves only little noise.

Still additionally, since the movable section of the sensor can hardly turn in a direction perpendicular to the torsional axis in a swinging motion, it is possible to provide an acceleration sensor as a micro-actuator that operates highly accurately.

Furthermore, since the deflection rigidities can be increased if the torsional rigidity is reduced, it is possible to provide an acceleration sensor as a micro-actuator that shows a large displacement and operates highly accurately.

Each of the above described embodiments comprising an outer frame, one or two torsion bars and a swinging member can be applied to an actuator, an optical deflector or a dynamic quantity sensor. If it is used as an actuator or an optical deflector, either electromagnetic force or electrostatic force may be used to turn the swinging member. If it is used as a dynamic quantity sensor, it is not necessary to provide means for generating such force, although such means may be provided if necessary.

When only a single torsion bar is used, it may not necessarily be arranged at the center of the swinging member depending on the purpose of turning the swinging member. For example, in the second embodiment that comprises an outer frame, a torsion bar and a swinging member, the torsion bar is not required to be at the center of the swinging member.

On the other hand, in the third embodiment that comprises an outer frame, a torsion bar and a swinging member, the torsion bar is not required to be off the center of the swinging member.

Embodiment 4

This embodiment of a movable micro-body is applied to an image forming apparatus.

An image forming apparatus that can be realized by applying this embodiment may be a projection type display or an electrophotograpy type image forming apparatus as will be described below.

Figure 13:
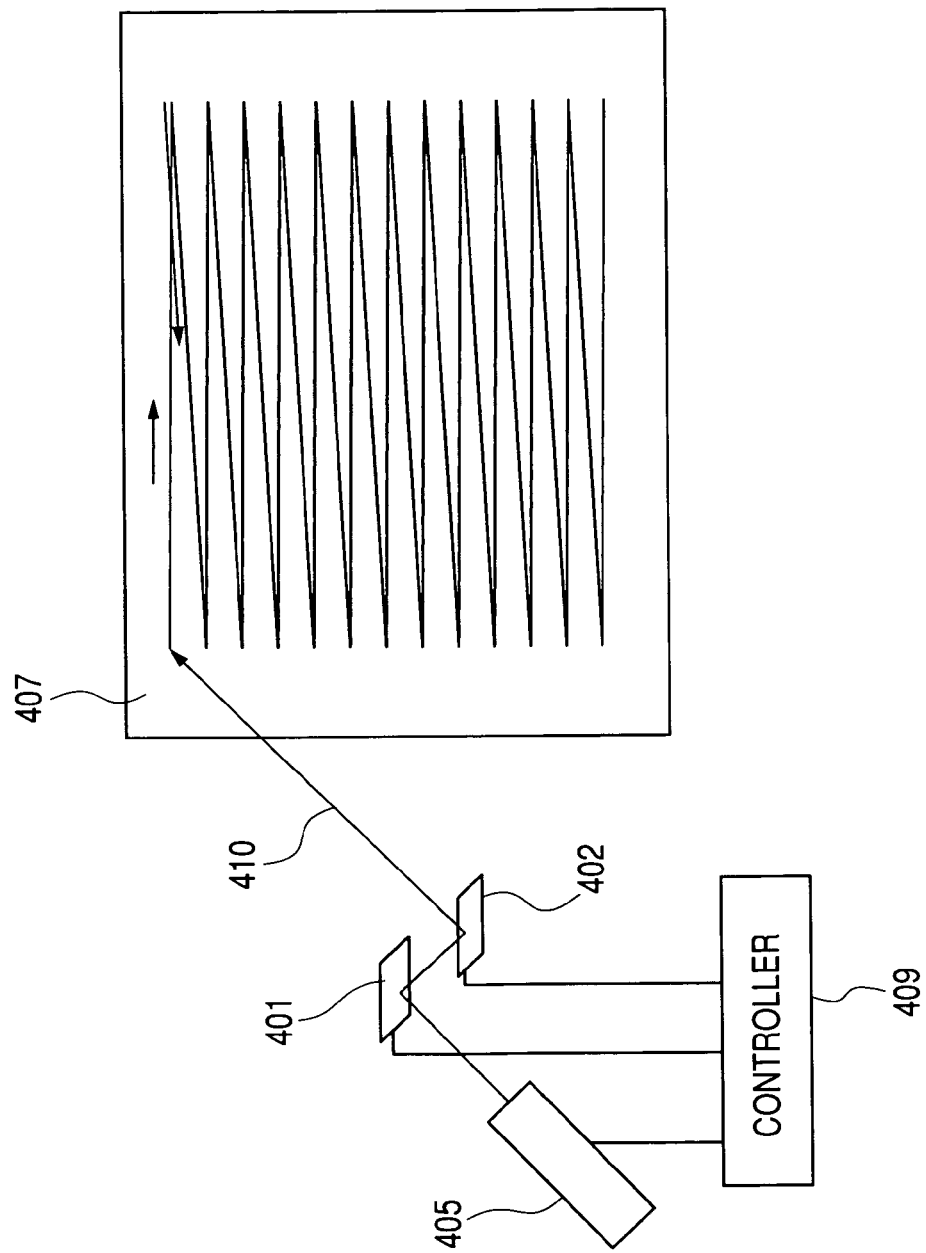
FIG. 13 is a schematic illustration of the fourth embodiment of a movable micro-body according to the invention, which is an optical scan type display, showing its configuration.

FIG. 13 is a schematic illustration of the fourth embodiment of a movable micro-body according to the invention, which is a projection type display, an optical scan type display to be more specific, showing its configuration. Referring to FIG. 13, the X (horizontal) optical deflector 401 and the Y (vertical) optical deflector 402 are the same as the optical deflector of the first embodiment. Controller 409 controls the X optical deflector 401 and the Y optical deflector 402 so as to cause a laser beam 410 to raster-scan the display screen 407. As the laser oscillator 405 is modulated according to the information to be displayed, an image is displayed on the display screen 407.

Thus, by applying a movable micro-body having a mirror, it is possible to provide an optical scan type display that is practically free from deformed images if it is subjected to external vibrations. In other words, it is possible to provide a mobile optical scan type display that can display images without deformations while it is moving.

Additionally, since the torsion bar can be made short, the optical deflector can be downsized to consequently downsize the entire display apparatus.

Beside a projection type image forming apparatus such as a display, this embodiment can also be applied to an electrophotography type image forming apparatus in which a reflected beam of light is made to scan horizontally and irradiate a cylindrical photosensitive drum, while either the photosensitive drum is rotating or the reflected beam of light is being moved in a peripheral direction of the photosensitive drum, so as to form a two-dimensional latent image on the photosensitive drum.

The present invention is described above by way of embodiments. Since the movable plate of a movable micro-body according to the invention can be supported by means of a support member with interposition of one or two link members that are arranged to intersect the torsion bars, it is possible to reduce the deflection of the movable plate. It is also possible to provide a movable micro-body whose angle of displacement can be made large by increasing the permissible angle of twist when the torsion bars are so formed as to show a rectangular cross section.

According to the invention, it is also possible to provide a movable micro-body whose torsion bars can be made relatively free from deviations from the axis produced by motions other than torsions by raising the deflection rigidities of the torsion bars and whose angle of displacement can be made large by increasing the permissible angle of twist.

According to the invention, it is also possible to provide an image forming apparatus that can prevent the displayed image from being deformed due to deviations from the axis of the moving plate that are caused by external vibrations.

According to the invention, it is also possible to provide a movable micro-body that will be hardly broken if it is dropped and subjected to a shock.

What is claimed is:

1. A movable micro-body comprising:
   a movable plate having a surface;
   at least one torsion bar extending in a longitudinal direction and supporting said movable plate;
   a support member supporting said movable plate by way of said torsion bar; and
   at least one link member arranged in a direction intersecting the longitudinal direction of said torsion bar and linking said support member and said torsion bar, wherein said support member, said torsion bar and said movable plate are integrally formed from a single material.

2. The movable micro-body according to claim 1, wherein two torsion bars are arranged at opposite sides of said movable plate, and a link member is arranged on each of said torsion bars.

3. The movable micro-body according to claim 1, wherein only one torsion bar is provided and arranged at a lateral side of said movable plate, and said link member is arranged on said torsion bar.

4. The movable micro-body according to claim 1, wherein only one torsion bar is provided and arranged at a lateral side of said movable plate, and said movable plate is provided with a projecting section at a side opposite to said torsion bar, with said projecting section being separated from said support member, with said link member being arranged on said projecting section.

5. The movable micro-body according to claim 1, wherein a cross section of said torsion bar taken along a direction perpendicular to an intra-planar direction of said movable plate surface shows a width as observed along a longitudinal direction of said link member smaller than a width of a cross section as observed along the direction perpendicular to the longitudinal direction.

6. The movable micro-body according to claim 1, wherein said link member is made of a material different from said support member, said torsion bar and said movable plate.

7. An optical deflector comprising a movable micro-body according to claim 1 and light reflecting means arranged on said movable plate.

8. An image forming apparatus comprising an optical deflector according to claim 7 and a light source, and adapted to form an image by causing a beam of light emitted from said light source to be reflected by said light reflecting means and scanned.

9. The image forming apparatus according to claim 8 that is a light beam scanning type display.

10. An electrophotography type image forming apparatus comprising an image forming apparatus according to claim 8 and a photosensitive body adapted to receive the scanning beam of light.

11. A dynamic quantity sensor comprising a movable micro-body according to claim 1 and detection means for detecting a relative positional displacement of said support member and said movable plate.

* * * * *